United States Patent
Gupta et al.

(10) Patent No.: US 11,985,009 B2
(45) Date of Patent: May 14, 2024

(54) DETERMINING COVARIANCE USING A LOSSY COMPRESSION METHOD

(71) Applicant: NOKIA SOLUTIONS AND NETWORKS OY, Espoo (FI)

(72) Inventors: Richa Gupta, Bangalore (IN); Suresh Kalyanasundaram, Bangalore (IN)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 18/238,132

(22) Filed: Aug. 25, 2023

(65) Prior Publication Data
US 2024/0097943 A1   Mar. 21, 2024

(51) Int. Cl.
H04L 5/12 (2006.01)
H04B 7/0456 (2017.01)
H04L 25/02 (2006.01)

(52) U.S. Cl.
CPC ......... H04L 25/021 (2013.01); H04B 7/0456 (2013.01)

(58) Field of Classification Search
CPC ............................ H04L 25/021; H04B 7/0456
USPC ........................................................ 375/262
See application file for complete search history.

(56) References Cited

U.S. PATENT DOCUMENTS 8,040,278 B2 * 10/2011 Maltsev .............. H01Q 3/2605
455/562.1
2011/0176439 A1 * 7/2011 Mondal .............. H04L 25/0391
370/252
2018/0167183 A1 * 6/2018 Zhang ................. H04B 7/0456
(Continued)

FOREIGN PATENT DOCUMENTS

WO   2016/051792 A1   4/2016
WO   2018/128895 A1   7/2018
(Continued)

OTHER PUBLICATIONS

Communication of Acceptance—section 29 a of Patents Decree dated Jan. 18, 2023 corresponding to Finnish Patent Application No. 20225790.
(Continued)

*Primary Examiner* — Helene E Tayong
(74) *Attorney, Agent, or Firm* — SQUIRE PATTON BOGGS (US) LLP

(57) ABSTRACT

A method includes estimating an uplink channel for a terminal device, based on an amount of antennas used by an access node for transmitting signals to the terminal device, antennas used for receiving the transmitted signals at the terminal device, and sub-bands used for transmitting the signals. Based on the estimation, a channel covariance matrix is determined for a precoder comprised in a transmitter of the access node by determining a limited number of elements of a full dimensional channel covariance matrix, which is different than the channel covariance matrix. The limited number of elements are elements corresponding to i-th row and j-th column of the channel covariance. Correlation computation is performed for the limited number of elements. Elements of the full-dimensional channel covariance matrix that are excluded from the limited number of elements are determined and set to be zero. Precoding is performed using the determined channel covariance matrix.

14 Claims, 7 Drawing Sheets

(56) References Cited

U.S. PATENT DOCUMENTS

2022/0181791 A1    6/2022  Venkatesan et al.

FOREIGN PATENT DOCUMENTS

WO      2020/200471 A1    10/2020
WO      2021/142629 A1    7/2021

OTHER PUBLICATIONS

Finnish Search Report dated Jan. 18, 2023 corresponding to Finnish Patent Application No. 20225790.
J. Yu et al., "Long-Term Channel Statistic Estimation for Highly-Mobile Hybrid MmWave Multi-User MIMO Systems," In: IEEE Transactions on Vehicular Technology, IEEE, Nov. 27, 2020, vol. 69, No. 12, pp. 14277-14289.
Extended European Search Report dated Feb. 20, 2024 corresponding to European Patent Application No. 23195024.7.
Huawei et al., "Dicussion on UE complexity of DFT-based compression codebook," 3GPP Draft; R1-1906032, 3GPP TSG RAN WG1 Meeting #97, Reno, USA, May 13-17, 2019, May 13, 2019, XP051727489.

* cited by examiner

DETERMINING COVARIANCE USING A LOSSY COMPRESSION METHOD

CROSS REFERENCE TO RELATED APPLICATION

This application claims the benefit of Finnish Patent Application No. 20225790, filed Sep. 12, 2022. The entire content of the above-referenced application is hereby incorporated by reference.

FIELD

The following exemplary embodiments relate to wireless communication and using multiple transmit and receive antennas.

BACKGROUND

Wireless communication networks, such as cellular communication networks, may use for data transmission multiple transmit and receive antennas that enable utilizing spatial diversity of a transmission channel. Using amplitude scaling and phase adjustment to multiple transmit antennas of the array, the transmitted signal may be beamformed in a desired direction to increase data rates and range due to high power reaching a target receiver.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising means for: estimating an uplink channel for a terminal device, wherein the estimation is based on an amount of antennas used by an access node for transmitting signals to the terminal device, on an amount of antennas used for receiving the transmitted signals at the terminal device and on an amount of sub-bands used for transmitting the signals, based on the estimation, determining a channel covariance matrix for a precoder comprised in a transmitter of the access node by determining a limited number of elements of a full dimensional channel covariance matrix, which is different than the channel covariance matrix, wherein the limited number of elements are those elements corresponding to i-th row and j-th column of the channel covariance matrix where distance between physical manifestation of the elements corresponding to i-th row and j-th column is determined to be less than a threshold distance from each other and performing correlation computation for the limited number of elements, determining elements of the full-dimensional channel covariance matrix that are excluded from the limited number of elements and set them to be zero, and performing precoding using the determined channel covariance matrix.

In some example embodiments according to the first aspect, the means comprises at least one processor, and at least one memory, including a computer program code, wherein the at least one memory and the computer program code are configured, with the at least one processor, to cause the performance of the apparatus.

According to a second aspect there is provided an apparatus comprising at least one processor, and at least one memory including a computer program code, wherein the at least one memory and the computer program code are configured, with the at least one processor, to cause the apparatus to: estimate an uplink channel for a terminal device, wherein the estimation is based on an amount of antennas used by an access node for transmitting signals to the terminal device, on an amount of antennas used for receiving the transmitted signals at the terminal device and on an amount of sub-bands used for transmitting the signals, based on the estimation, determine a channel covariance matrix for a precoder comprised in a transmitter of the access node by determining a limited number of elements of a full dimensional channel covariance matrix, which is different than the channel covariance matrix, wherein the limited number of elements are those elements corresponding to i-th row and j-th column of the channel covariance matrix where distance between physical manifestation of the elements corresponding to the i-th row and the j-th column is determined to be less than a threshold distance from each other, and performing correlation computation for the limited number of elements, determine elements of the full-dimensional channel covariance matrix that are excluded from the limited number of elements and set them to be zero, and perform precoding using the determined channel covariance matrix.

According to a third aspect there is provided a method comprising: estimating an uplink channel for a terminal device, wherein the estimation is based on an amount of antennas used by an access node for transmitting signals to the terminal device, on an amount of antennas used for receiving the transmitted signals at the terminal device and on an amount of sub-bands used for transmitting the signals, based on the estimation, determining a channel covariance matrix for a precoder comprised in a transmitter of the access node by determining a limited number of elements of a full dimensional channel covariance matrix, which is different than the channel covariance matrix, wherein the limited number of elements are those elements corresponding to i-th row and j-th column of the channel covariance matrix where distance between physical manifestation of the elements corresponding to the i-th row and j-th column is determined to be less than a threshold distance from each other, and performing correlation computation for the limited number of elements, determining elements of the full-dimensional channel covariance matrix that are excluded from the limited number of elements and set them to be zero, and performing precoding using the determined channel covariance matrix.

In some example embodiments according to the third aspect, the method is a computer-implemented method.

According to a fourth aspect there is provided a computer program comprising instructions for causing an apparatus to perform at least the following: estimate an uplink channel for a terminal device, wherein the estimation is based on an amount of antennas used by an access node for transmitting signals to the terminal device, on an amount of antennas used for receiving the transmitted signals at the terminal device and on an amount of sub-bands used for transmitting the signals, based on the estimation, determine a channel covariance matrix for a precoder comprised in a transmitter of the access node by determining a limited number of elements of a full dimensional channel covariance matrix, which is different than the channel covariance matrix, wherein the limited number of elements are those elements corresponding to i-th row and j-th column of the channel covariance matrix where distance between physical manifestation of the elements corresponding to the i-th row and j-th column is determined to be less than a threshold distance from each other and performing correlation computation for the limited number of elements, determine elements of the full-dimensional channel covariance matrix that are excluded from the limited number of elements and set them to be zero, and perform precoding using the determined channel covariance matrix.

According to a fifth aspect there is provided a computer program comprising instructions stored thereon for performing at least the following: estimating an uplink channel for a terminal device, wherein the estimation is based on an amount of antennas used by an access node for transmitting signals to the terminal device, on an amount of antennas used for receiving the transmitted signals at the terminal device and on an amount of sub-bands used for transmitting the signals, based on the estimation, determining a channel covariance matrix for a precoder comprised in a transmitter of the access node by determining a limited number of elements of a full dimensional channel covariance matrix, which is different than the channel covariance matrix, wherein the limited number of elements are those elements corresponding to i-th row and j-th column of the channel covariance matrix where distance between physical manifestation of the elements corresponding to the i-th row and the j-th column j is determined to be less than a threshold distance from each other, and performing correlation computation for the limited number of elements, determining elements of the full-dimensional channel covariance matrix that are excluded from the limited number of elements and set them to be zero, and performing precoding using the determined channel covariance matrix.

According to a sixth aspect there is provided a non-transitory computer readable medium comprising program instructions for causing an apparatus to perform at least the following: estimate an uplink channel for a terminal device, wherein the estimation is based on an amount of antennas used by an access node for transmitting signals to the terminal device, on an amount of antennas used for receiving the transmitted signals at the terminal device and on an amount of sub-bands used for transmitting the signals, based on the estimation, determine a channel covariance matrix for a precoder comprised in a transmitter of the access node by determining a limited number of elements of a full dimensional channel covariance matrix, which is different than the channel covariance matrix, wherein the limited number of elements are those elements corresponding to i-th row and j-th column of the channel covariance matrix where distance between physical manifestation of the elements corresponding to the i-th row and j-th column is determined to be less than a threshold distance from each other, and performing correlation computation for the limited number of elements, determine elements of the full-dimensional channel covariance matrix that are excluded from the limited number of elements and set them to be zero, and perform precoding using the determined channel covariance matrix.

According to a seventh aspect there is provided a non-transitory computer readable medium comprising program instructions stored thereon for performing at least the following: estimating an uplink channel for a terminal device, wherein the estimation is based on an amount of antennas used by an access node for transmitting signals to the terminal device, on an amount of antennas used for receiving the transmitted signals at the terminal device and on an amount of sub-bands used for transmitting the signals, based on the estimation, determining a channel covariance matrix for a precoder comprised in a transmitter of the access node by determining a limited number of elements of a full dimensional channel covariance matrix, which is different than the channel covariance matrix, wherein the limited number of elements are those elements corresponding to i-th row and j-th column of the channel covariance matrix where distance between physical manifestation of the elements corresponding to the i-th row and the j-th column is determined to be less than a threshold distance from each other, and performing correlation computation for the limited number of elements, determining elements of the full-dimensional channel covariance matrix that are excluded from the limited number of elements and set them to be zero, and performing precoding using the determined channel covariance matrix.

According to an eighth aspect there is provided a computer readable medium comprising program instructions stored thereon for performing at least the following: estimating an uplink channel for a terminal device, wherein the estimation is based on an amount of antennas used by an access node for transmitting signals to the terminal device, on an amount of antennas used for receiving the transmitted signals at the terminal device and on the amount of sub-bands used for transmitting the signals, based on the estimation, determining a channel covariance matrix for a precoder comprised in a transmitter of the access node by determining a limited number of elements of a full dimensional channel covariance matrix, which is different than the channel covariance matrix, wherein the limited number of elements are those elements corresponding to i-th row and j-th column of the channel covariance matrix where distance between physical manifestation of the elements corresponding to the i-th row and the j-th column is determined to be less than a threshold distance from each other, and performing correlation computation for the limited number of elements, determining elements of the full-dimensional channel covariance matrix that are excluded from the limited number of elements and set them to be zero, and performing precoding using the determined channel covariance matrix.

LIST OF DRAWINGS

In the following, the invention will be described in greater detail with reference to the embodiments and the accompanying drawings, in which FIG. 1 illustrates an example embodiment of a radio access network.

DESCRIPTION OF EMBODIMENTS

Figure 1:
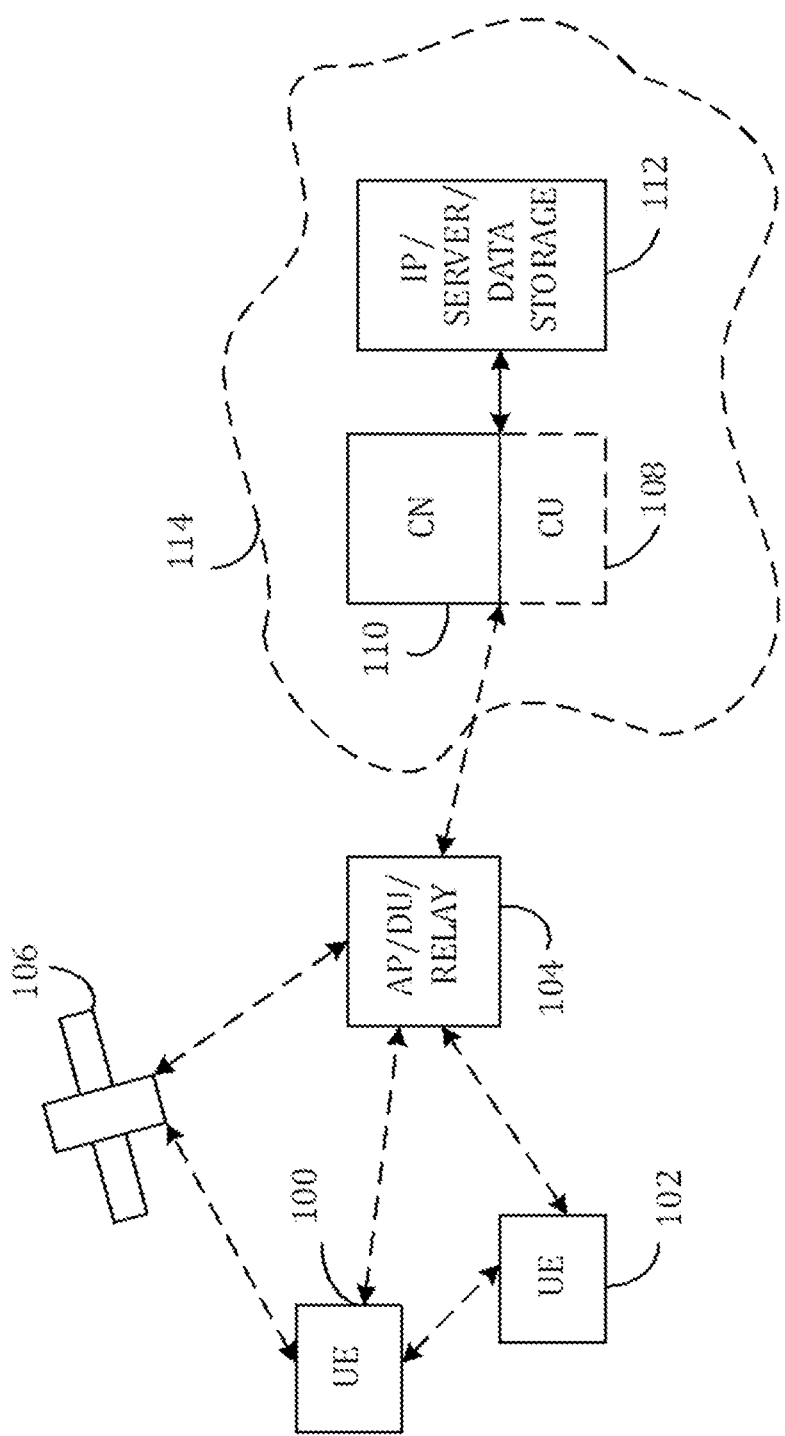

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor (s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The wireless link from a terminal device to a (e/g)NodeB is called uplink or reverse link and the wireless link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require bringing the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SD N). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling or service availability in areas that do not have terrestrial coverage. Satellite communication may utilise geostationary earth orbit (GEO) satellite systems, but also low earth orbit (LEO) satellite systems, for example, mega-constellations. A satellite 106 comprised in a constellation may carry a gNB, or at least part of the gNB, that create on-ground cells. Alternatively, a satellite 106 may be used to relay signals of one or more cells to the Earth. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network may aggregate traffic from a large number of HNBs back to a core network.

The usage of MIMO to have multiple transmit and receive antennas and thus utilizing spatial diversity of the channel allows to improve user throughput and/or reliability of data transmission. Using amplitude scaling and phase adjustment to multiple transmit antennas of an antenna array, a transmitted signal may be beamformed in a desired direction to increase achievable data rates and range due to high power reaching a target receiver. The antenna array used for transmitting may reside in one device, such as an access node, and the target receiver may be comprised in another device such as a terminal device. A transmitter, such as a transmitter comprised in an access node, may comprise a precoder to direct the transmission of the signal in the dominant spatial direction of the channel in the spatial domain (SD). The directing of the transmission of the signal may optionally be performed in a frequency-dependent fashion. The precoder, which may also be understood as a beamformer, in the spatial domain may correspond to the dominant angular sub-space of the channel, and the precoder may adapt, in frequency domain, the spatial precoding in a frequency-specific way to address the frequency-selective multi-path fading.

An access node, such as a gNB, that uses the antenna array to transmit signals, may estimate an UL channel of terminal devices and use the estimated channel to determine a precoder to obtain suitable beamforming for DL transmissions. The beamforming may be determined using a matrix that may be determined from the spatial covariance matrix of the channel. Frequency domain (FD) vectors may be determined from an FD covariance matrix to enhance the precoding in the FD. The determined precoder may then be applied to the DL transmission of signals and a demodulation reference signal (DMRS) and may optionally also be applied to beamformed reference signals used for Channel State Information (CSI) feedback, i.e., channel state information reference signal (CSI-RS) transmission. As such, multiple SD and FD bases may be determined by determining a channel covariance in SD and FD respectively and using them to beamform CSI-RS ports differently in the spatial and frequency domain. Thus, precoding each of the CSI-RS ports in SD and FD may be obtained such that SD beamforming weights and FD weights at the access node are determined based on SRS measurements in UL. Each CSI-RS port may be beamformed in the SD and FD domains using one pair of strong SD and FD bases chosen from their respective covariance matrices. A terminal device may then measure these CSI-RS ports and report the channel quality, rank and the information related to precoder matrix that is used at access node for generating the final precoder for DL transmission on the physical downlink shared channel (PDSCH), and optionally also on the physical downlink control channel (PDCCH).

Computing SD and FD bases for each terminal device served by the access node, at the access node, may be intensive in terms of processing given that the dimensions of the antenna array may be large in massive MIMO. This increases the complexity of the SD covariance computation and dominant spatial beam determination. Also, determining covariance matrix and bases in frequency domain may be computationally complex given the number of sub-bands in 5G for example. Supporting higher resolution of the FD precoder in frequency domain may thus increase the dimension of the covariance matrix and hence the complexity.

The access node may estimate the UL channel using UL SRS transmission from terminal devices that it serves. The access node may then determine beamforming weights for DL transmission using the channel estimates obtained from these UL SRS transmissions. In case of time division duplex (TDD) with unpaired spectrum, the DL beams estimated from UL channel estimates may be accurate given that full reciprocity is expected. In case of frequency division duplex (FDD) with paired spectrum, the channels may be partially reciprocal between UL and DL, in which case there may be a need to further refine the beamformers determined from the UL channel estimates. To aid such a refinement, a larger number of beamformed CSI-RS ports may be transmitted thus allowing the terminal devices to first perform port selection and sub-select a set of ports, and then apply weights on these ports to maximize the expected throughput at the terminal devices. The precoder in the spatial domain may direct the transmission in the dominant angular sub-space of the channel and the frequency domain bases may then refine the beams in the frequency domain to adapt to the frequency selectivity of the channel. A channel covariance matrix may be determined in the frequency domain based on the estimated channel on a sub-band basis and used for determination of the precoder in FD. The correlation of the adjacent channel may be preserved in the determination of the covariance matrix for the accuracy of the precoder.

Figure 2:
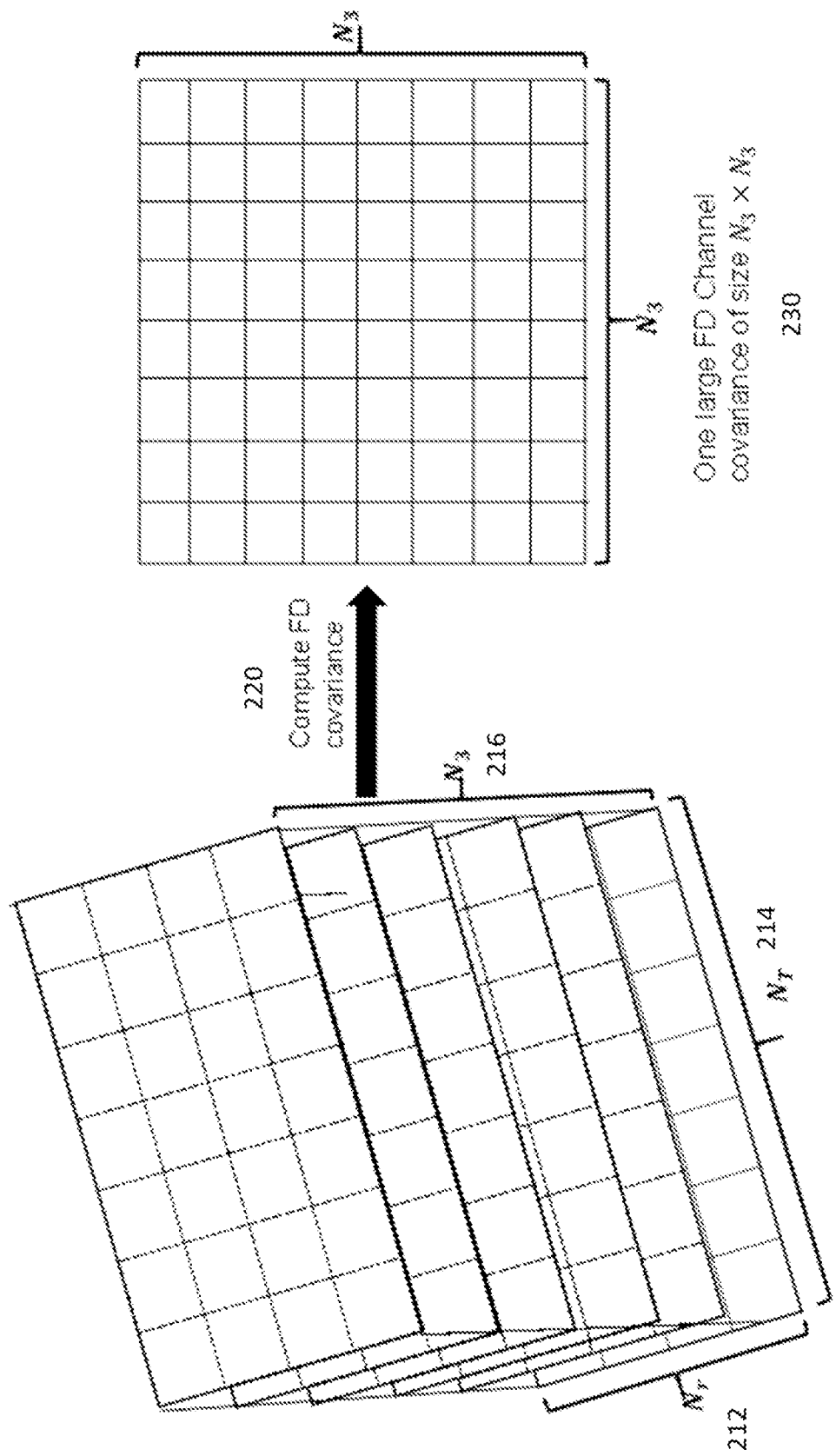
FIG. 2 illustrates an example embodiment of determining a covariance matrix.

FIG. 2 illustrates an example embodiment of determining of covariance matrix in FD. The channel covariance in frequency domain may be determined, which may be understood as computing or calculating as well, by taking an outer product of the channel matrices averaging the frequency domain correlation across all transmit and receive antennas of the estimated channel as follows:

$$R_{N_3 \times N_3}^{FD} = (\text{resize}(H)_{N_r N_T \times N_3})^H \text{resize}(H)_{N_r N_T \times N_3},$$

where $H_{N_r \times N_T \times N_3}$ is the UL estimated channel 210 at the access node on the $N_T$ antennas transceivers (TRXs) 214, A antennas at a terminal device 212 and $N_3$ sub-bands 216 in the FD. The function resize adjusts the dimension of the matrix as per the desired format, in this case $N_r N_T$ rows and $N_3$ columns. FD bases may be obtained by performing eigen value decomposition (EVD) of the frequency domain channel covariance and selecting a few dominant eigen vectors, or by projecting the covariance on to a set of GoB vectors, e.g., oversampled DFT vectors. This approach of using the full dimensional covariance matrix without any simplifications may be referred to as baseline.

The covariance matrix in frequency domain 230 in this example embodiment has dimensions ($N_3 \times N_3$), which may be considered as large. For example, if the number of channel quality indicator (CQI) sub-bands is 17 for 100 MHz bandwidth and frequency resolution for precoder is R=2 (number of precoder matrix indicator (PMI) sub-bands within a CQI sub-band), then the size of covariance matric will be 34×34. The computation of such a large covariance matrix and further matrix operations for such large-sized matrices may thus be computationally intensive.

It would thus be beneficial to enable reduction of the computational complexity of determining the FD covariance matrix without incurring too large a cost in terms of the accuracy of the beamformers determined. Also, a graceful trade-off of computational complexity for over-the-air performance, such that it can be implemented in different processors with varying capabilities in terms of operations per second, is desirable. One way to achieve this by not computing the least-significant elements of the FD covariance matrix and thereby saving a number of multiplication and addition operations of complex numbers in the covariance matrix computation and in further processing of the covariance matrix, while preserving the correlation between adjacent physical resource blocks (PRBs) in frequency domain for better accuracy of the precoder that is determined using this covariance matrix. Not having some elements in the covariance matrix reduces the complexity of dominant beam determination as well.

Figure 3:
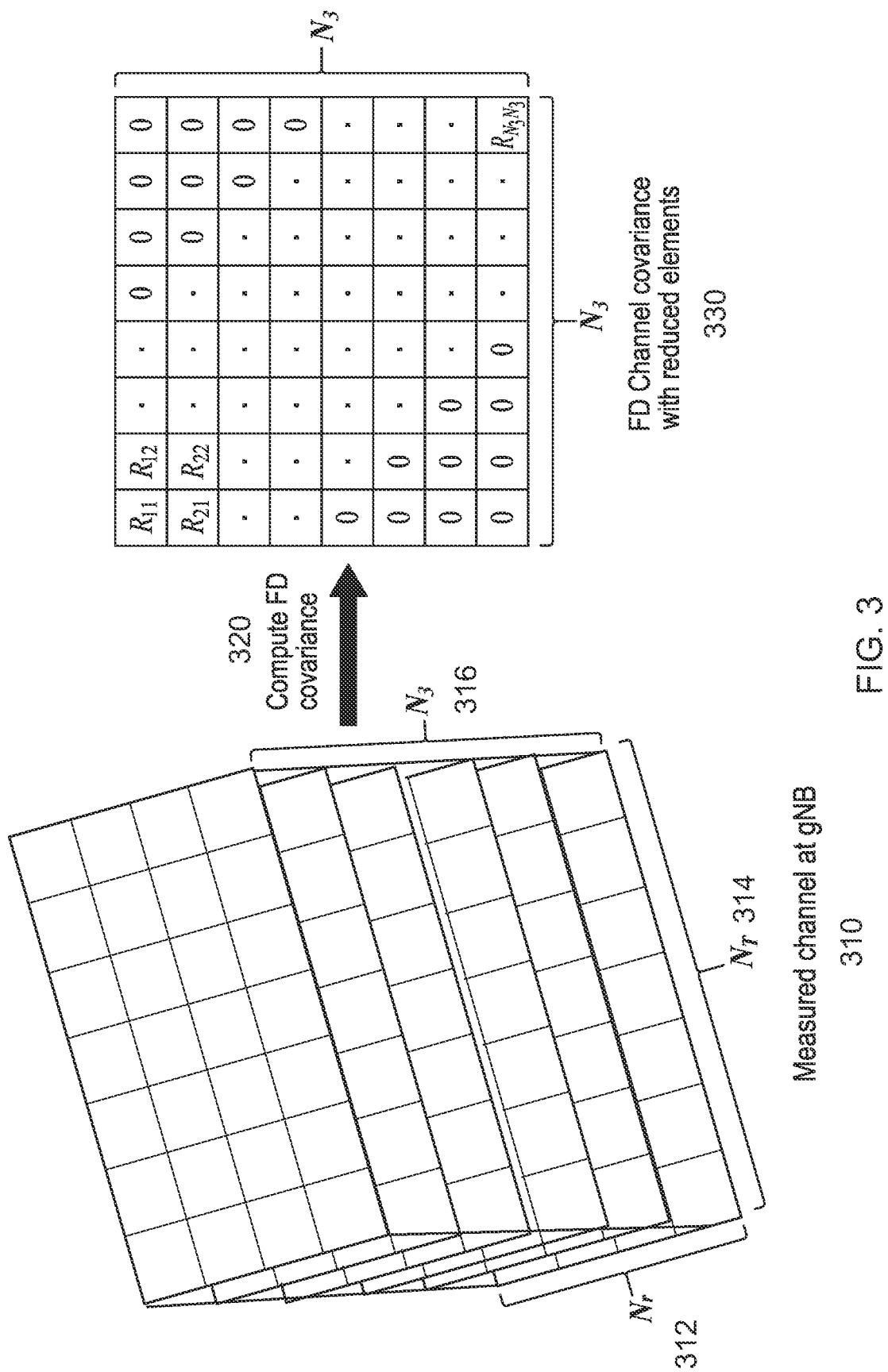
FIG. 3 illustrates an example embodiment of reducing complexity of determining a covariance matrix for a precoder.

FIG. 3 illustrates an example embodiment of reducing complexity of determining a covariance matrix for a precoder. The complexity is reduced by obtaining a covariance matrix that is simpler than a full covariance matrix. The simpler covariance matrix may then be used to determine eigen vectors or select a subset of beams from a GoB (Grid of Beams), which also minimizes the complexity involved in determining those vectors.

When determining a full covariance matrix for a channel, the transmit-side channel covariance matrix may be computed as a product of the channel matrix H and its Hermitian, i.e., $H^H H$, where H is the estimated channel matrix 310, estimated by the access node, such as a gNB, and superscript H represents Hermitian operation.

In this example embodiment, a limited number of elements in the full-dimensional channel covariance matrix in frequency domain are computed and the least significant entries are removed. The least significant entries may be determined to be for example correlation computation for the elements of channel matrix H where the channels are not expected to be highly correlated, i.e., those that are not "close" enough to each other. The determination is based on the sub-bands not being as adjacent as per the coherence bandwidth have less correlation, and hence may be ignored for the FD bases determination.

In this example embodiment, to determine the simplified covariance matrix the (i,j)-th term of the frequency domain covariance matrix $R^{FD}(i,j)$ averaged across all transmit and receive antennas is computed 320 as follows:

$$R^{FD}(i,j) = \begin{cases} [(\text{resize}(H)_{N_r N_T \times N_3})^H(i,:)](\text{resize}(H)_{N_r N_T \times N_3})(:,j), & \text{if } |i-j| < d_{thresh} \\ 0 & \text{otherwise} \end{cases}$$

where $N_3$ is the number of frequency units 316 for which FD bases is to be determined, $N_T$ is the number of transmit antennas at the access node 314, and $N_r$ is the number of receive antennas at the terminal device 312, and $d_{thresh}$ is a pre-determined value for a distance within the full covariance matrix. The function resize adjusts the dimension of the matrix to the desired format.

Thus, the element $R_{i,j}$ in the $i^{th}$ row and $j^{th}$ column is determined on the condition that $|i-j| < d_{thres}$ and other elements of the full covariance matrix may be set to 0 and hence the multiplications and additions needed for those matrix elements do not need to be computed and the simplified covariance matrix 330 is obtained as the elements of the covariance matrix which have $|i-j| \geq d_{thres}$ are less correlated and hence may be ignored to reduce the complexity. In the obtained simplified covariance matrix 330 the entries that are off the main diagonal by a certain threshold are illustrated as 0. Also, the symmetric elements of this simplified covariance matrix are complex conjugates of each other (i.e., $R_{i,j} = R^*_{j,i}$), and therefore it is enough to determine one of these entries. Thus, in this example embodiment it is enough to determine the main diagonal and the entries above or below the main diagonal.

In this example embodiment, what is determined is a band of elements along the main diagonal such that $|i-j| < d_{thres}$, where i and j are the row index and column index of the covariance matrix, respectively of the full channel covariance matrix $H^H H$, and the remaining ones are set to zero to obtain the simplified covariance matrix. It is to be noted that a physical manifestation of the elements i and j may be considered as corresponding to a distance between the sub-bands in the frequency domain covariance. As such, in this example embodiment, a limited number of elements are determined and those elements are elements corresponding to the i-th row and the j-th column of the covariance matrix for which the distance between the physical manifestation of those elements is determined to be less than a threshold distance from each other. The simplified covariance matrix may be denoted as R' and its determination is simpler as many entries may not need to be computed, thus avoiding many complex number multiplications. Determining the dominant FD bases using either EVD or projection on to discrete Fourier transformation (DFT) vectors, or other suitable methods, also require less computation because of the sparsity of the covariance matrix.

Figure 4:
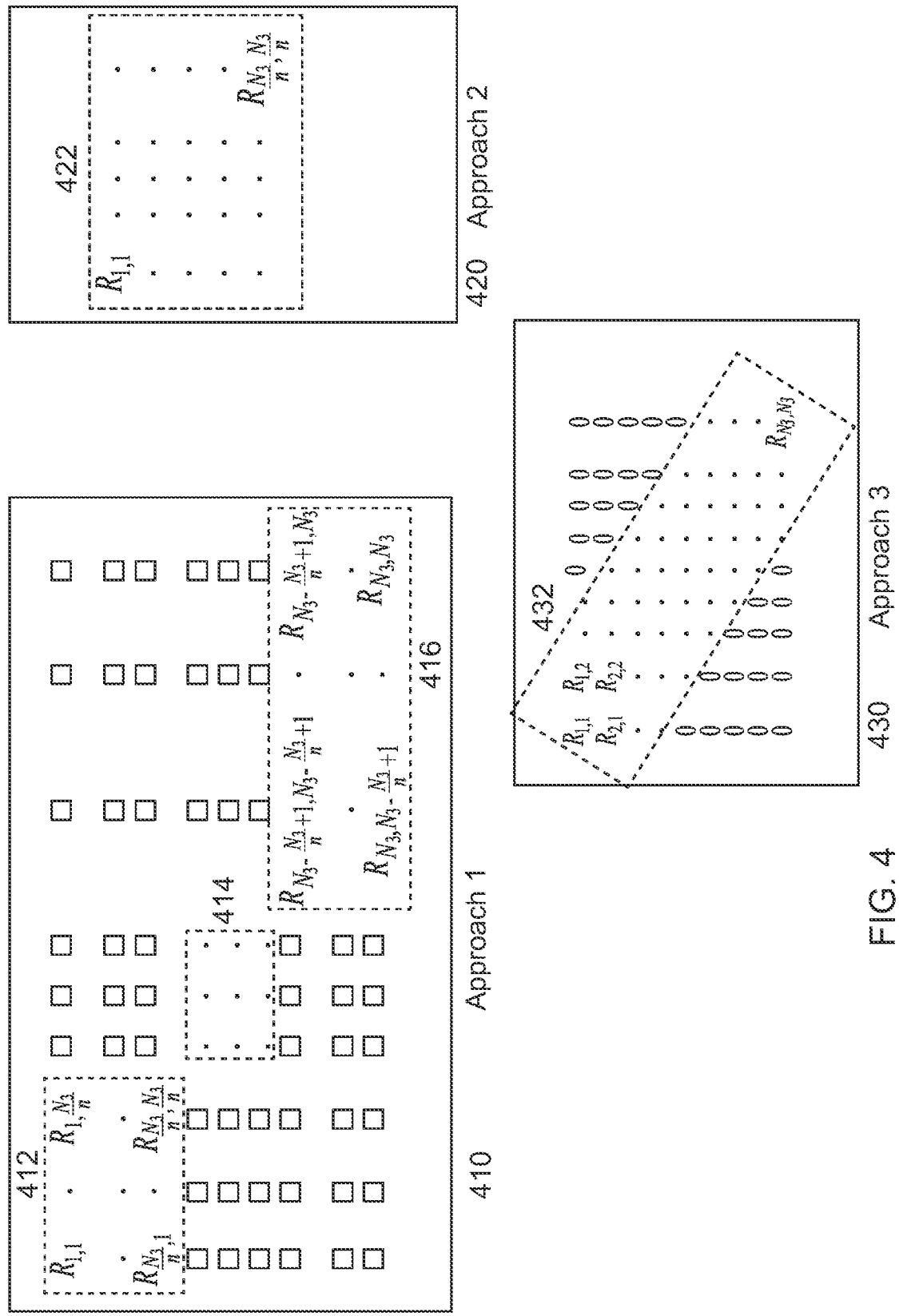
FIG. 4 illustrates a comparison in terms of a structure of a simplified covariance matrix in view of two other covariance matrices.

FIG. 4 illustrates a comparison in terms of a structure of a simplified covariance matrix in view of two other covariance matrixes that may be estimated for a channel. The first approach 410 is to form multiple covariance matrices of smaller sizes 412, 414 and 415. These covariance matrices of smaller sizes 412, 414 and 416 are in the form of blocks arranged in a diagonal of the full matrix. In this approach, the smaller sizes 412, 414 and 416 may be determined by dividing a total number of frequency units $N_3$ by a factor n and obtaining the covariance matrices for each such frequency band of size $$\frac{N_3}{n}.$$

It is to be noted that last sub-band will be of size $N_{3\_remain}$, where $N_{3\_remain}$ is the available number of frequency units after forming all but last frequency band. The $k^{th}$ covariance matrix is given by $$R^{FD}_{k\frac{N_3}{n}\times\frac{N_3}{n}} = \left(\text{resize}(H)_{N_r N_t \times \frac{N_3}{n}}\right)^H \text{resize}(H)_{N_r N_t \times \frac{N_3}{n}}.$$

Dominant beams of size $$\frac{N_3}{n} \times 1$$

are then determined from each covariance matrix and use the beamformer for each frequency band from above as the precoder for that sub-band.

The second approach 420 a single covariance matrix 422 of smaller size compared to the full covariance matrix is determined. The full covariance matrix may be understood as a full dimensional covariance matrix. In this second approach, in order to reduce the computational complexity of $N_3 \times N_3$ size covariance, the channel over a certain number of adjacent sub-bands is averaged and thus the FD covariance in a lower dimension is determined. This may be equivalent to setting a smaller $N_3$ and may be done by averaging the channel over n contiguous frequency sub-bands to make one larger sub-band that provides $$\frac{N_3}{n}$$

such sub-bands in the entire frequency band. One can then compute a single FD covariance of size $$\frac{N_3}{n} \times \frac{N_3}{n}$$

using the channel matrix of reduced size $$\frac{N_3}{n}$$

in frequency domain, i.e., $$R^{FD}_{\frac{N_3}{n}\times\frac{N_3}{n}} = \left(\text{resize}(H)_{N_r N_t \times \frac{N_3}{n}}\right)^H \text{resize}(H)_{N_r N_t \times \frac{N_3}{n}}.$$

Dominant beams of size $$\frac{N_3}{n} \times 1$$

each using me FD covariance of size $$\frac{N_3}{n} \times \frac{N_3}{n}$$

are then determined. To obtain the FD-bases of size $N_3 \times 1$, replicate the component from FD vector for frequency band t for all the n original frequency sub-bands that correspond to t.

The third approach 430 is the approach of determining the simplified covariance matrix introduced above in the previous example embodiment in which a band of entries along the main diagonal 432 are determined. In other words, non-zero entries of the channel covariance in the form of a band along the main diagonal of the matrix are determined in the approach 430.

The third approach 430 may reduce the computation required by not calculating some of the less-significant elements of covariance matrix, which reduces the processing complexity for covariance matrix computation as well as dominant beam determination. However, as some elements are discarded from the full covariance matrix, the information available for dominant beam determination may be incomplete in view of the full covariance matrix. Yet, reasonable performance may still be achieved because the granularity of precoder is not reduced, and correlation of the highly correlated adjacent sub-bands is not ignored.

The performance of the different approaches may be determined for example as $$\frac{\|V'^H R V'\|}{\|V^H R V\|},$$

i.e., performance with regard to a baseline, where V is the dominant vector(s) determined based on the full covariance matrix R, and V' is the dominant beam determined using the simplified covariance matrix R'. The larger the performance metric is the better the approximation R' is to R. This metric is <1, as the performance using the simplified covariance matrix is not better than using the original covariance matrix R. The term $\|V^H R V\|$ represents the signal power in the chosen FD basis vector V. This metric may also be determined for a covariance matrix of basis vectors V, in which case the metric may be modified to determine the trace of the resultant matrix as $$\frac{\|tr(V'^H R V')\|}{\|tr(V^H R V)\|}.$$

It is to be noted though that the accuracy of the simplified covariance matrix depends, at least partly, on the predetermined threshold $d_{thres}$, which is used to determine which elements to set to the value 0. The larger the threshold, the more the elements of the full covariance matrix that are retained and vice versa. The performance may be expected to improve with larger value of $d_{thres}$. The value of $d_{thres}$ may be determined such that the values of such entries, that correspond to correlation between sub-bands that are larger than the coherence bandwidth of the channel, are set to 0.

Table 1 below illustrates the computational complexity of the number of matrix multiplications needed for FD covariance computation for the different approaches introduced in the example embodiment of FIG. 4.

TABLE 1

| Baseline | 1st Approach | 2nd Approach | 3rd Approach |
|---|---|---|---|
| Matrix of size $N_r N_T \times N_3$. The covariance matrix is Hermitian hence it is enough that the entries above or below the main diagonal are calculated along with the main diagonal itself, complexity is $$\frac{N_3(N_3+1)}{2} N_r N_T =$$ $$O(N_3^2 N_r N_T)$$ | n matrices of size $N_r N_T \times \frac{N_3}{n}$, complexity is $$n \frac{\left(\frac{N_3}{n}\right)\left(\frac{N_3}{n}+1\right)}{2} N_r N_T$$ $$O\left(n\left(\frac{N_3}{n}\right)^2 N_r N_T\right) =$$ $$O\left(\frac{N_3^2}{n} N_r N_T\right)$$ | matrix of size $N_r N_T \times \frac{N_3}{n}$, complexity is $$\frac{\left(\frac{N_3}{n}\right)\left(\frac{N_3}{n}+1\right)}{2} N_r N_T =$$ $$O\left(\left(\frac{N_3}{n}\right)^2 N_r N_T\right)$$ | Matrix of size $N_r N_T \times N_3$. For each row of the covariance matrix, $i \in \{0, 1, \ldots N_3 - 1\}$, computing required is $\min(d_{thres}, N_3 - i)$ entries per row, and to compute each entry $N_r N_T$ complex multiplies are needed, and there are $N_3$ total rows. The exact number of complex multiplications are $$\left(\left(d_{thresh} * \frac{d_{thresh}+1}{2}\right) + (N_3 - d_{thresh}) * d_{thresh}\right) N_r N_T.$$ Thus the complexity is $O(d_{thres} N_3 N_r N_T)$. |

In table 1, the complexity computation may be understood as the number of complex multiplications to compute the covariance matrix, and the other simpler computations, such as, additions are ignored. Additionally, the calculations take into account that the matrices are Hermitian and hence it is enough that one half of the matrix is to be computed. As an example, for the baseline, for each row of covariance matrix, that is $i \in \{0, 1, \ldots N_3-1\}$, it is required to compute $\{N_3, N_3-1, \ldots 1\}$ elements in the upper diagonal including the main diagonal. This requires $$\frac{N_3(N_3+1)}{2}$$

computations or elements of size $N_r N_t$. In the third approach, only for $d_{thres}$ rows $N_3-i \leq d_{thres}$ and hence the complexity for these multiplications for upper or lower diagonal entries (including the main diagonal) are $$\left(d_{thres} * \frac{d_{thres}+1}{2}\right) N_r N_T$$

and for remaining rows where $d_{thres} < N_3-i$, the complexity is $(N_3-d_{thres})*d_{thres} N_r N_T$. It is to be noted that the largest dimensions are used for worst case complexity computation in the notation of "O".

Figure 5:
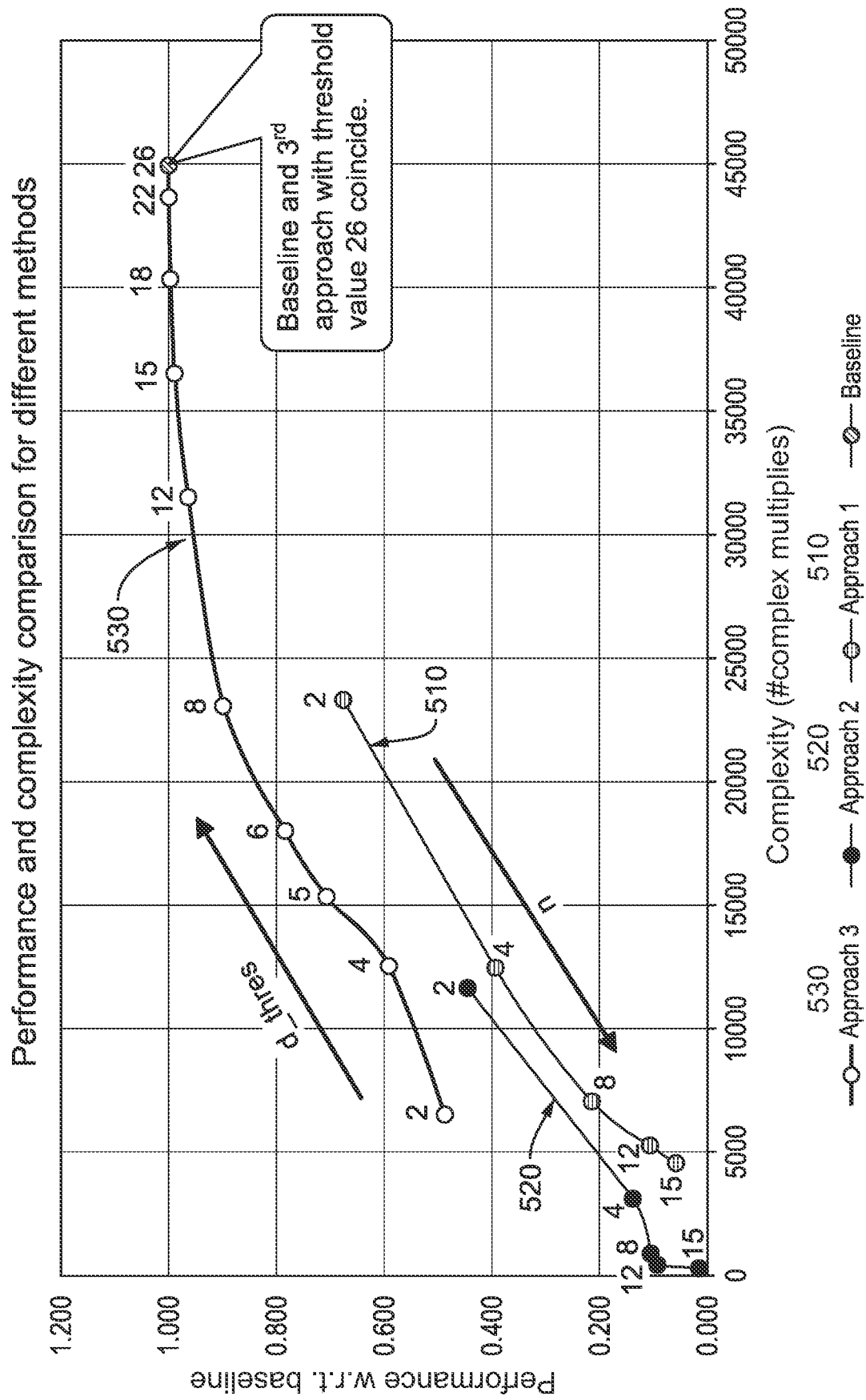
FIG. 5 illustrates a graph regarding performance.

FIG. 5 illustrates a graph regarding performance of the different approaches in view of the computational complexity and to compare the performance versus complexity trade-off of the different methods. The graphs are based on simulations and plot the performance versus complexity of the different approaches to determine the FD covariance discussed in the example embodiment of FIG. 4. In the FIG. 5, the first approach is illustrated as 510, the second approach is illustrated as 520, the third approach is illustrated as 530 and the baseline is illustrated as 540.

In the simulation illustrated by the graph of FIG. 5, the channel corresponds to a dense urban micro scenario with an inter-site distance of 200 m. The UL channel matrix H of size 4×32×26 is used in the ideal case, where $H \in \mathbb{C}^{N_r \times N_T \times N_3}$ and $N_3 = N_{SB} \times R$ with $R=2$, $N_{SB}$ is the number of RBs in a CQI subband and R is the number of PMI sub-bands within a CQI sub-band. The dominant eigen beam from each method of computing the covariance is determined and the received powers are compared. Taking the received power as 1 for the baseline method, i.e., when exact channel covariance is used without any modifications to reduce complexity, the performance of other methods is computed with regard to the baseline, i.e., the performance metric $$\frac{\|V'^H R V'\|}{\|V^H R V\|}$$

is compared for the different approaches.

An example value is determined for the $1^{st}$ approach, when n=2, the channel matrix is divided in two halves, and hence each covariance is of size 13×13 and two such covariances are determined. However, for n=2 in the $2^{nd}$ approach, every 2 consecutive sub-bands are averaged to get a single FD covariance of size 13×13.

The performance metric is plotted on the y-axis and the complexity is the number of complex multiplications and is a version of the complexity comparison shown in Table 1 using the number of antennas at a terminal device ($N_r$=4) and an access node ($N_T$=32), number of subbands ($N_3$=26) and for different values of $d_{thres}$ and n.

The performance comparison illustrated in FIG. 5 among the different approaches shows higher received power with the third approach for the same complexity compared to the $1^{st}$ and $2^{nd}$ approaches. The third approach provides a parameterization that gets the performance closest to the baseline, i.e., using full covariance matrix for modest values of $d_{thres}$) e.g., at threshold for distance between row and column $d_{thres}$=8, there is a 10% reduction in the performance with the proposed method when compared to the baseline. The complexity with $d_{thres}$=8 is reduced by 50% when compared to Baseline. The $1^{st}$ and the $2^{nd}$ approach provide poorer performance because of losing the accuracy of the FD covariance used in the FD bases determination.

To quantify the impact of the threshold $d_{thres}$ on performance, the plots show the received power for different values of $d_{thres} \in \{1, 2, \ldots, N_3\}$. As expected, the performance improves with the increasing value of the threshold because this allows more elements of the covariance matrix to be computed and hence increases the accuracy of the FD bases. The improvement is larger with increase in the threshold at lower values of the threshold, and the curve flattens at higher values. The performance reaches that of the baseline for around $d_{thres} \geq 15$. It may also be observed that the complexity increases with increase in $d_{thres}$ because more and more elements of the covariance matrix are to be computed when compared to the case of lower $d_{thres}$.

For the $1^{st}$ and the $2^{nd}$ approaches, both complexity and performance drop with the increase in value of n. For the $1^{st}$ approach, increase in value of n reduces the size of multiple covariance matrices and hence there is larger loss in the correlation information between sub-bands. In the second approach, increase in the value of n averages out more sub-bands to form fewer number of frequency sub-bands. If larger complexity can be afforded, then the $1^{st}$ approach out-performs the $2^{nd}$ approach, but always poorer than the $3^{rd}$ approach.

Figure 6:
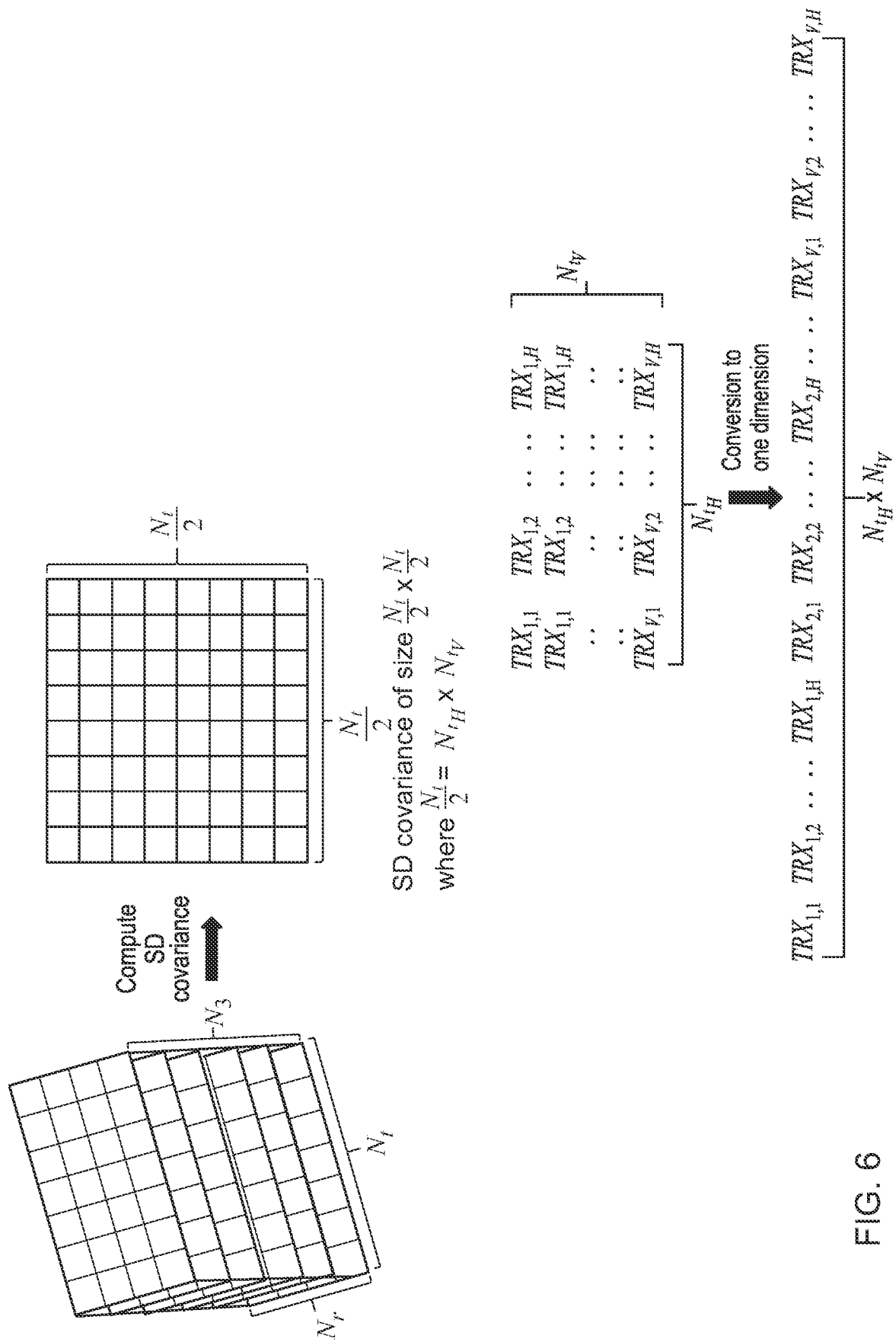
FIG. 6 illustrates an example embodiment of determining elements within a pre-determined threshold distance of each other are computed for spatial domain.

FIG. 6 illustrates an example embodiment in which elements, that are within a pre-determined threshold distance of each other, of the channel covariance matrix are computed for spatial domain such as antenna space. In this example embodiment, a correlation of adjacent antennas may be preserved in each dimension of the antenna array for the computation of covariance for the accuracy of the precoder. In this example embodiment, there is a transceiver (TRX) array averaged over polarizations, frequency units and antennas of a terminal device. Transceiver $N_{t_V}$ and transceiver $N_{t_H}$ are the transmit antennas in vertical and horizontal dimension. In this example embodiment, the TRX array arrangement is two-dimensional and there are $N_{t_H}$ and $N_{t_V}$ TRXs are arranged in horizontal and vertical dimension, where total number of TRXs, $N_t = N_{t_H} \times N_{t_V}$. The dominant beams in spatial domain (SD) may be determined using a spatial channel covariance matrix, which may be determined by computing an average of transmit antenna correlation across the two polarizations, all antennas of a terminal device and frequency units:

$$R^{SD}_{\frac{N_t}{n} \times \frac{N_t}{n}} = \left(\text{resize}(H)_{2N_r N_3 \times \frac{N_t}{n}}\right)^H \text{resize}(H)_{2N_r N_3 \times \frac{N_t}{n}}.$$

SD beams may then be obtained by performing eigen decomposition of the spatial domain channel covariance and selecting a few dominant eigen vectors or by taking the projection of the spatial covariance on to the oversampled DFT vectors and finding the dominant beams.

Applying the approach 3 to SD, in this example embodiment, for the SD covariance matrix of size $$\frac{N_t}{2} \times \frac{N_t}{2}$$

is to be adjusted for the element correlation between rows and columns of the matrix because $$\frac{N_t}{2} = N_{t_H} \times N_{t_V}$$

is one dimensional conversion of an array that is two-dimensional. The TRXs in a dimension, e.g., horizontal elements, are correlated to adjacent elements in horizontal and less correlated to the far spaced elements. Thus, in this example embodiment, for the (i,j)-th element of the SD covariance matrix $R_{i,j}^{SD}$, inter-element distance may be determined as $C_{i,j} = (x(i)-x(j))^2 + (y(i)-y(j))^2$, where x(i) and y(i) are the coordinates of TRX i in horizontal and vertical directions. Additionally, the same applies for TRX j. Thus, computing the covariance matrix $R^{SD}$ of size $N_t \times N_t$, the element $R_{i,j}^{SD}$ may be computed if $C_{i,j} < d_{thresh}$, otherwise the element may be set as $R_{i,j}^{SD} = 0$.

It is to be noted that in this example embodiment a physical manifestation of the elements i and j in the spatial domain covariance matrix may be considered as corresponding to a physical distance between corresponding antenna elements expressed using (x,y) coordinates. As such, in this example embodiment, a limited number of elements are determined, and those elements are elements corresponding to the i-th row and the j-th column of the covariance matrix for which the distance between the physical manifestation of those elements is determined to be less than a threshold distance from each other.

Figure 7:
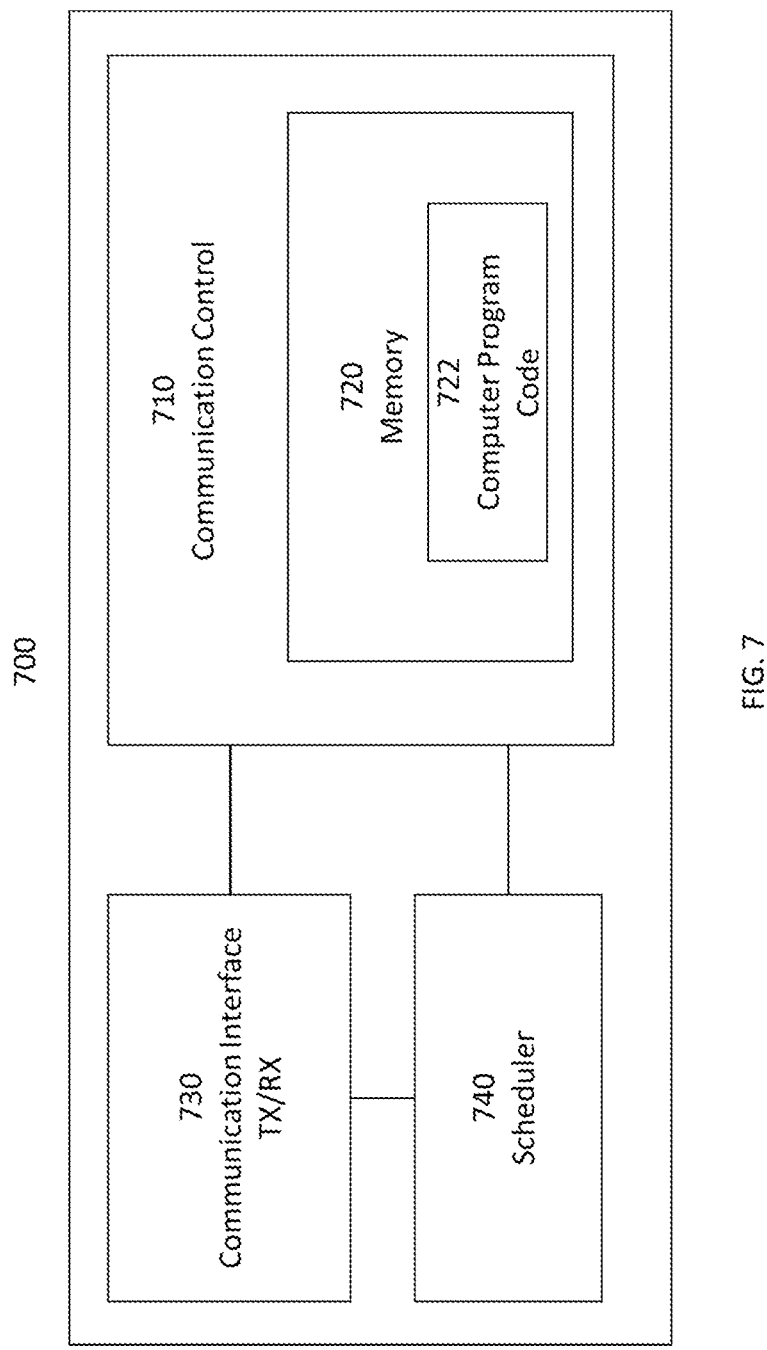
FIG. 7 illustrates an example embodiment of an apparatus.

The apparatus 700 of FIG. 7 illustrates an example embodiment of an apparatus that may be an access node or be comprised in an access node, and that may embody the activator or the reader as described above. The apparatus may be, for example, a circuitry or a chipset applicable to an access node to realize the described embodiments. The apparatus 700 may be an electronic device comprising one or more electronic circuitries. The apparatus 700 may comprise a communication control circuitry 710 such as at least one processor, and at least one memory 720 including a computer program code (software) 722 wherein the at least one memory and the computer program code (software) 722 are configured, with the at least one processor, to cause the apparatus 700 to carry out any one of the example embodiments of the access node described above.

The memory 720 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 700 may further comprise a communication interface 730 comprising hardware and/or software for realizing communication connectivity according to one or more communication protocols. The communication interface 730 may provide the apparatus with radio communication capabilities to communicate in the cellular communication system. The communication interface may, for example, provide a radio interface to terminal devices. The apparatus 1700 may further comprise another interface towards a core network such as the network coordinator apparatus and/or to the access nodes of the cellular communication system. The apparatus 700 may further comprise a scheduler 1740 that is configured to allocate resources.

Even though the invention has been described above with reference to example embodiments according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprised in, or connected to, an access node, the apparatus comprising:
   at least one processor; and
   at least one memory including a computer program code, wherein the at least one memory and the computer program code are configured, with the at least one processor, to cause the apparatus to:
   estimate an uplink channel for a terminal device, wherein the estimation is based on an amount of antennas used by the access node for transmitting signals to the terminal device, on an amount of antennas used for receiving the transmitted signals at the terminal device and on an amount of sub-bands used for transmitting the signals;
   based on the estimation, determine a channel covariance matrix for a precoder comprised in a transmitter of the access node by determining a limited number of elements of a full dimensional channel covariance matrix, which is different than the channel covariance matrix, wherein the limited number of elements are those elements corresponding to i-th row and j-th column of the channel covariance matrix where distance between the physical manifestation of the elements corresponding to the i-th row and the j-th column is determined to be less than a threshold distance from each other, and performing correlation computation for the limited number of elements;
   determine elements of the full-dimensional channel covariance matrix that are excluded from the limited number of elements and set them to be zero; and
   perform precoding using the determined channel covariance matrix.

2. The apparatus according to claim 1, wherein the apparatus is further caused to perform eigen value decomposition for the determined channel covariance matrix and to select eigen vectors.

3. The apparatus according to claim 1, wherein the apparatus is further caused to select, based on the determined channel covariance matrix, a subset of beams from a grid of beams.

4. The apparatus according to claim 1, wherein the full dimensional channel covariance matrix is determined as a product of a channel matrix and its Hermitian.

5. The apparatus according to claim 1, wherein a resize function is performed on the determined channel covariance matrix to adjust dimensions of the matrix.

6. The apparatus according to claim 1, wherein the channel covariance matrix is in a frequency domain or in a spatial domain.

7. The apparatus according to claim 1, wherein the access node is a gNB.

8. A method, comprising:
   estimating an uplink channel for a terminal device, wherein the estimation is based on an amount of antennas used by an access node for transmitting signals to the terminal device, on an amount of antennas used for receiving the transmitted signals at the terminal device and on an amount of sub-bands used for transmitting the signals;
   based on the estimation, determining a channel covariance matrix for a precoder comprised in a transmitter of the access node by determining a limited number of elements of a full dimensional channel covariance matrix, which is different than the channel covariance matrix, wherein the limited number of elements are those elements corresponding to i-th row and j-th column of the channel covariance matrix where distance between physical manifestation of the elements corresponding to the i-th row and j-th column is determined to be less than a threshold distance from each other, and performing correlation computation for the limited number of elements;
   determining elements of the full-dimensional channel covariance matrix that are excluded from the limited number of elements and set them to be zero; and
   performing precoding using the determined channel covariance matrix.

9. The method according to claim 8, wherein the method further comprises performing eigen value decomposition for the determined channel covariance matrix and selecting eigen vectors.

10. The method according to claim 8, wherein the method further comprises selecting, based on the determined channel covariance matrix, a subset of beams from a grid of beams.

11. The method according to claim 8, wherein the full dimensional channel covariance matrix is determined as a product of a channel matrix and its Hermitian.

12. The method according to claim 8, wherein the method further comprises performing a resize function on the determined channel covariance matrix to adjust dimensions of the matrix.

13. The method according to claim 8, wherein the channel covariance matrix is in a frequency domain or in a spatial domain.

14. A computer program embodied on a non-transitory computer-readable medium, said computer program comprising instructions for causing an apparatus to perform at least the following:
   estimate an uplink channel for a terminal device, wherein the estimation is based on an amount of antennas used by an access node for transmitting signals to the terminal device, on an amount of antennas used for receiving the transmitted signals at the terminal device and on an amount of sub-bands used for transmitting the signals;
   based on the estimation, determine a channel covariance matrix for a precoder comprised in a transmitter of the access node by determining a limited number of elements of a full dimensional channel covariance matrix, which is different than the channel covariance matrix, wherein the limited number of elements are those elements corresponding to i-th row and j-th column of the channel covariance matrix where distance between physical manifestation of the elements corresponding to the i-th row and j-th column is determined to be less than a threshold distance from each other and performing correlation computation for the limited number of elements;
   determine elements of the full-dimensional channel covariance matrix that are excluded from the limited number of elements and set them to be zero; and
   perform precoding using the determined channel covariance matrix.

* * * * *